C. A. TRIPP.
LIQUID DISPENSING MACHINE.
APPLICATION FILED OCT. 22, 1917.
1,366,221.
Patented Jan. 18, 1921.
9 SHEETS—SHEET 7.
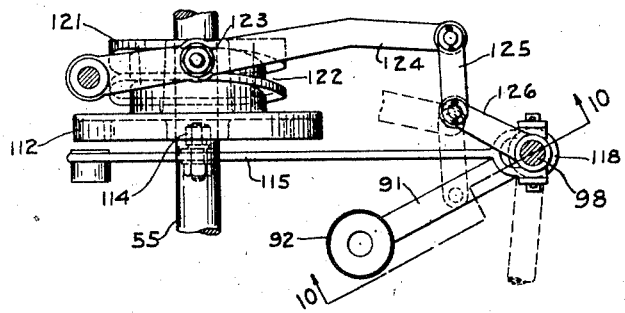
FIG. 9
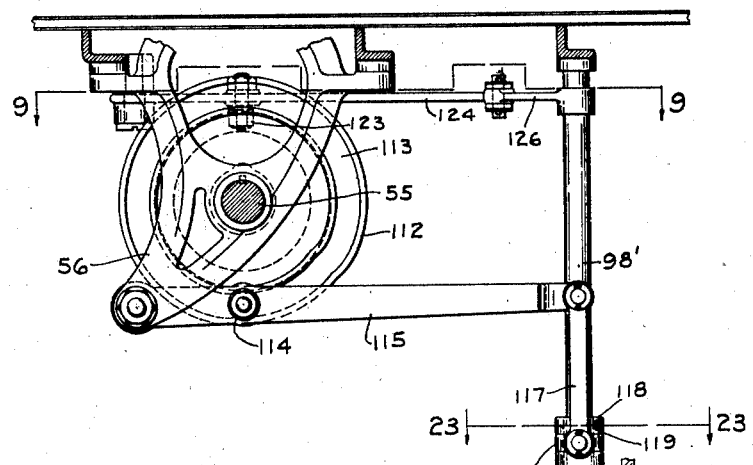
FIG. 8
FIG. 10
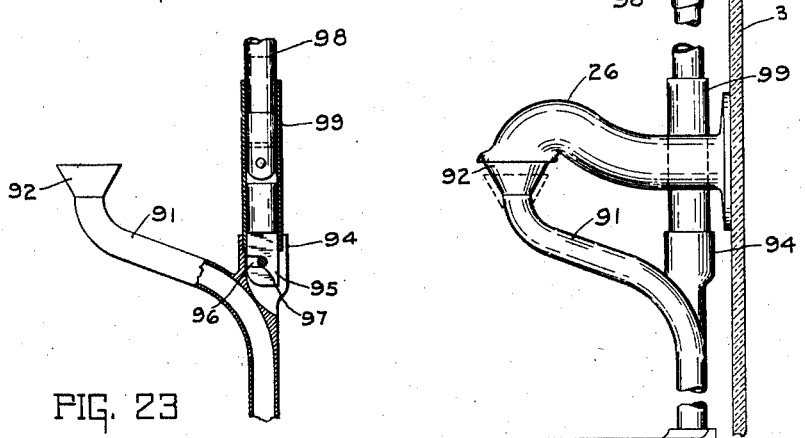
FIG. 23
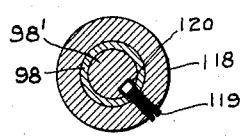
INVENTOR
CHARLES A. TRIPP
BY
Lockwood & Lockwood
ATTORNEYS C. A. TRIPP.
LIQUID DISPENSING MACHINE.
APPLICATION FILED OCT. 22, 1917.
1,366,221.
Patented Jan. 18, 1921.
9 SHEETS—SHEET 8.
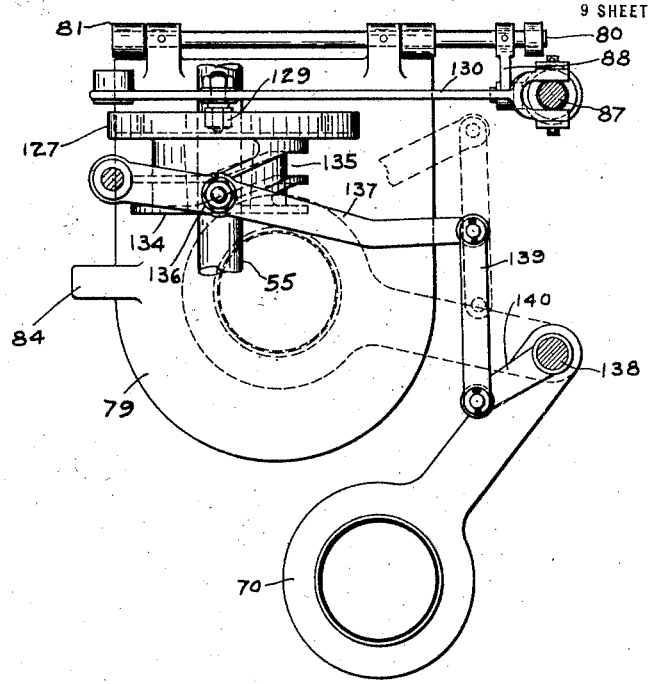
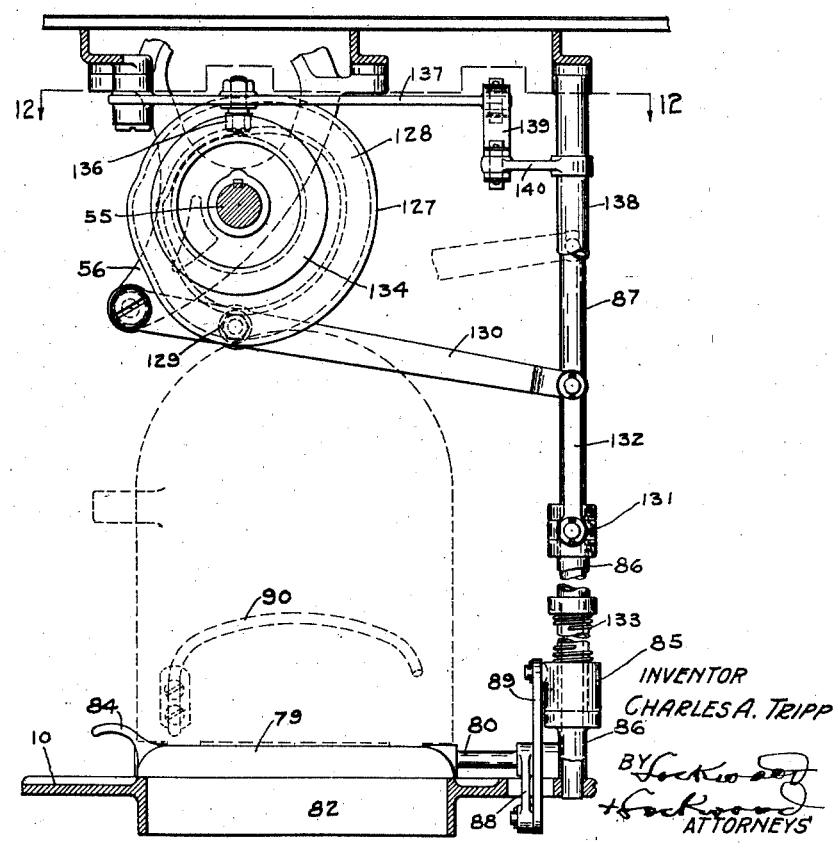
INVENTOR
CHARLES A. TRIPP
BY
ATTORNEYS

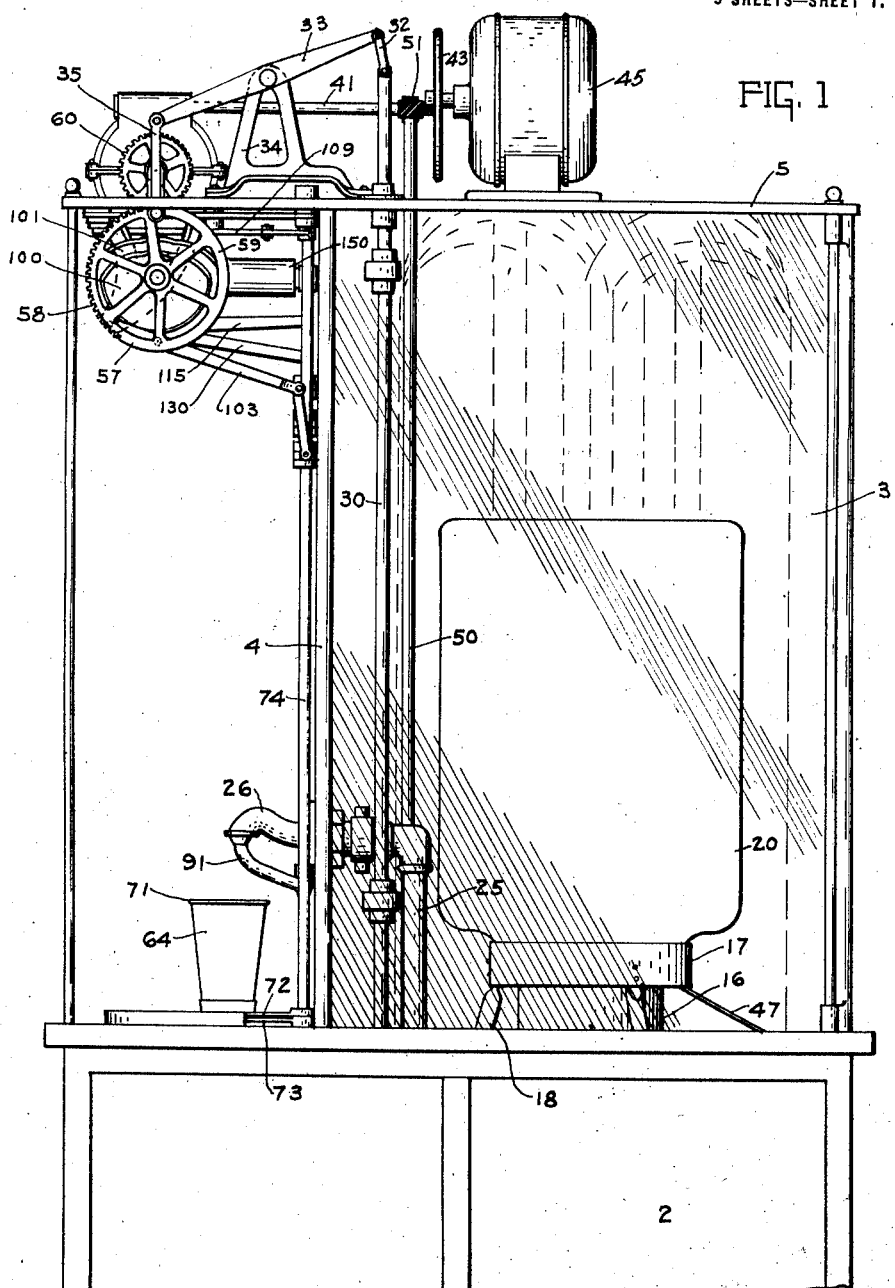

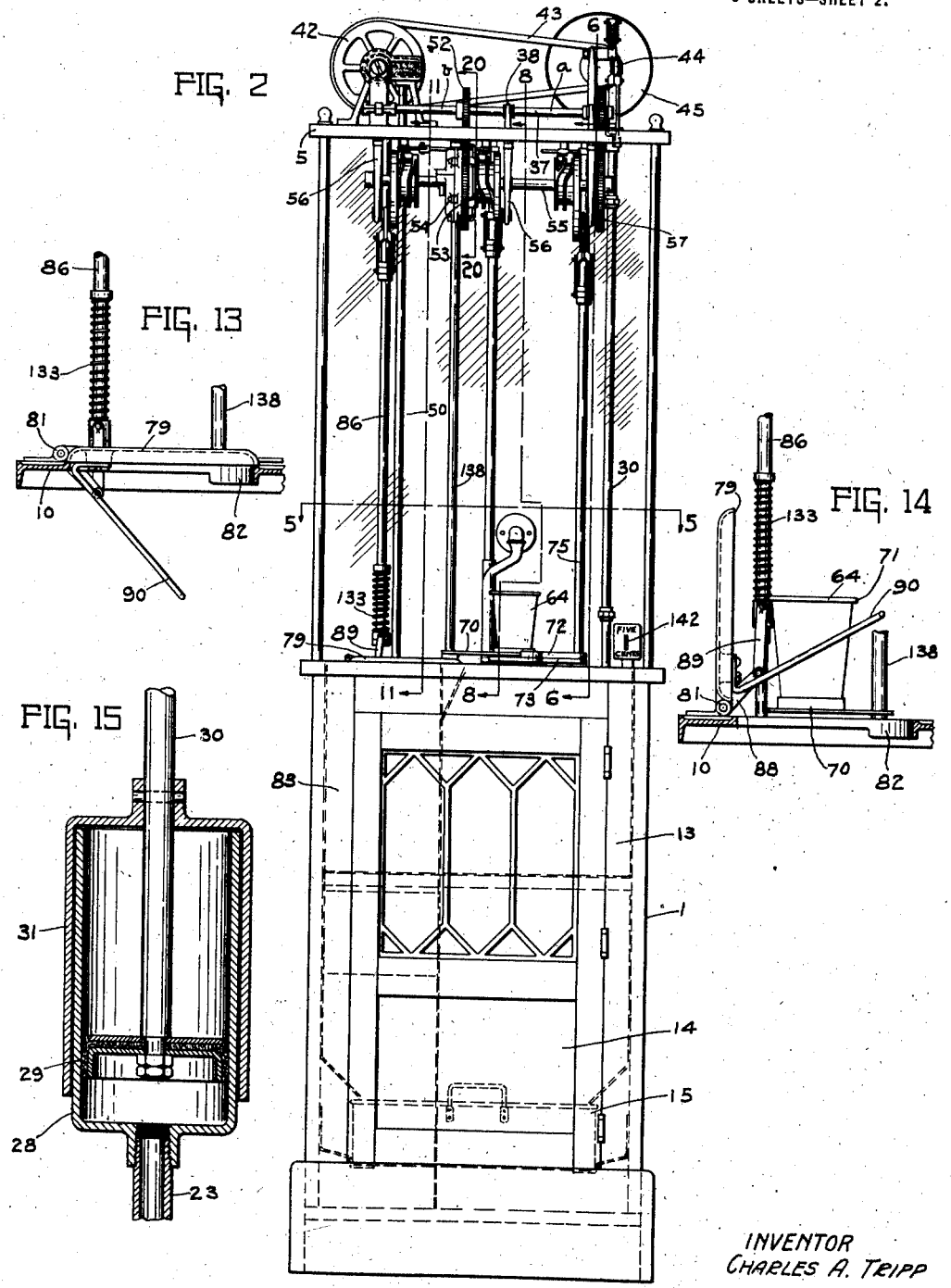

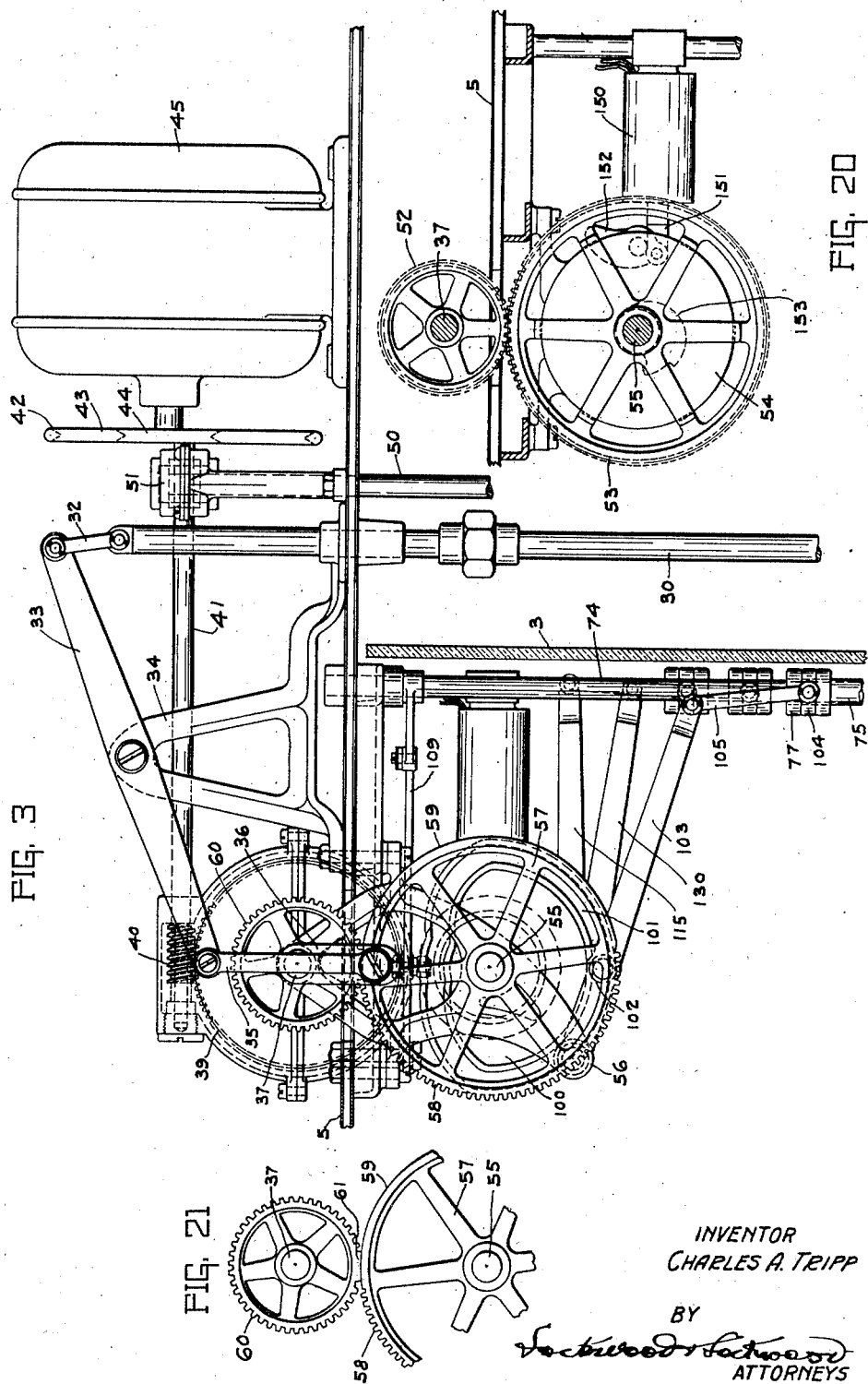

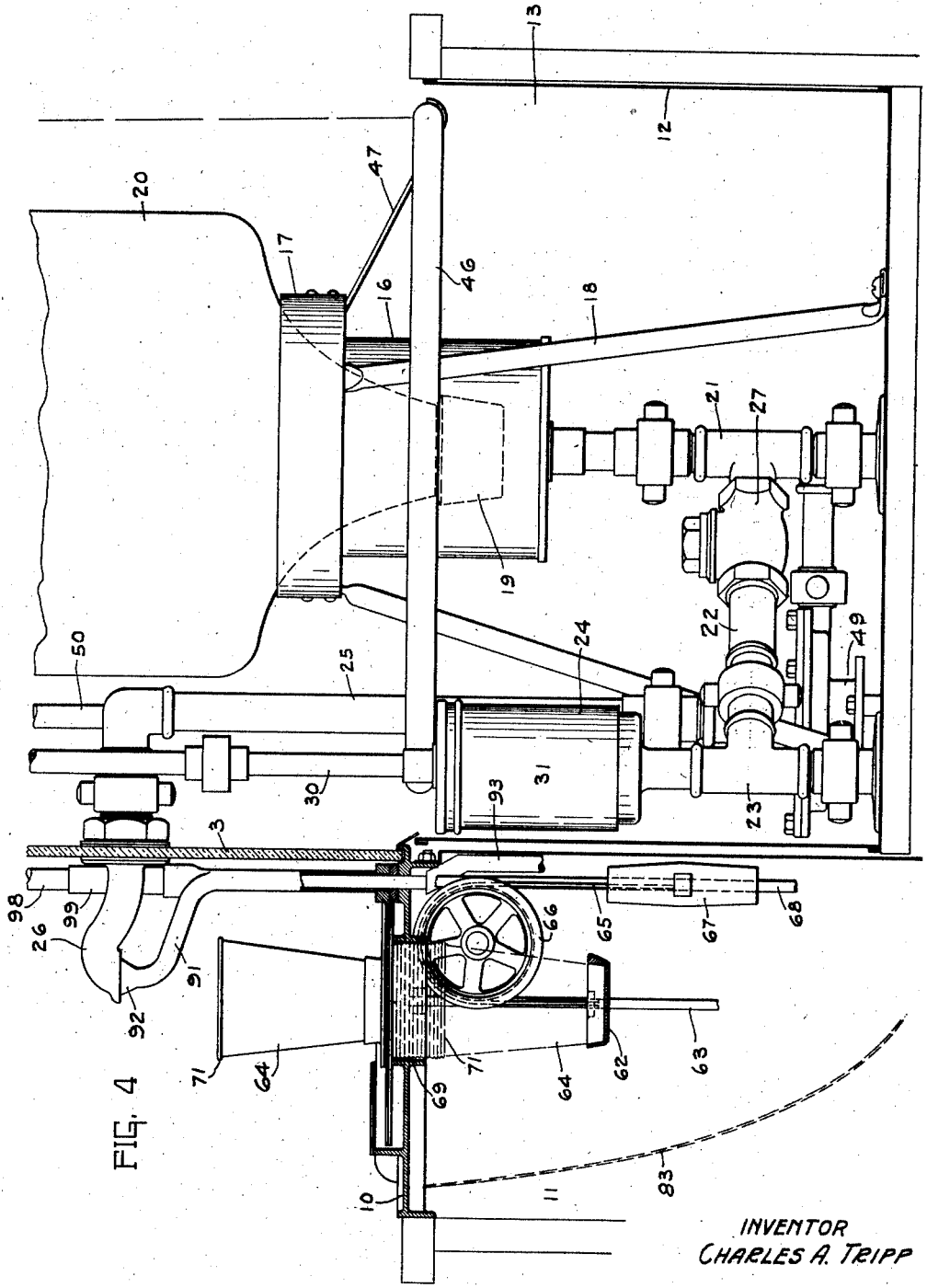

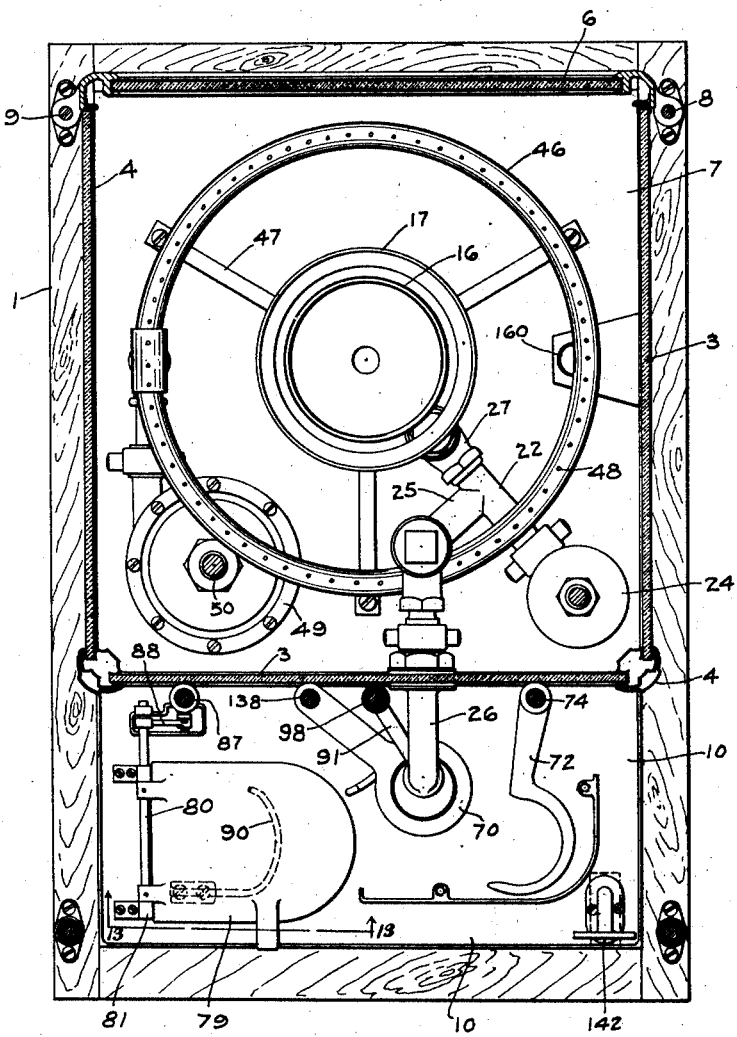

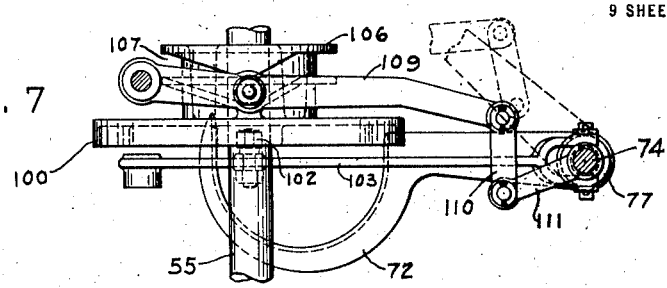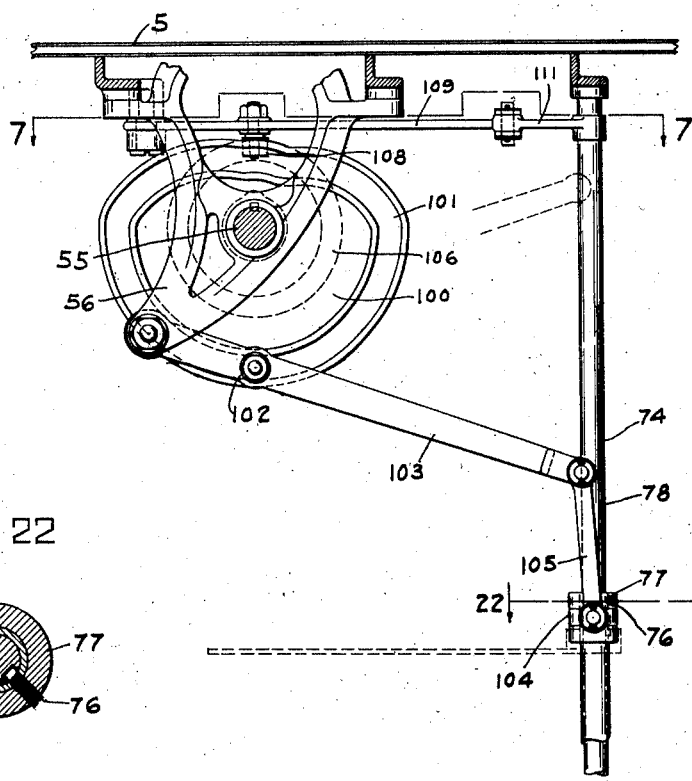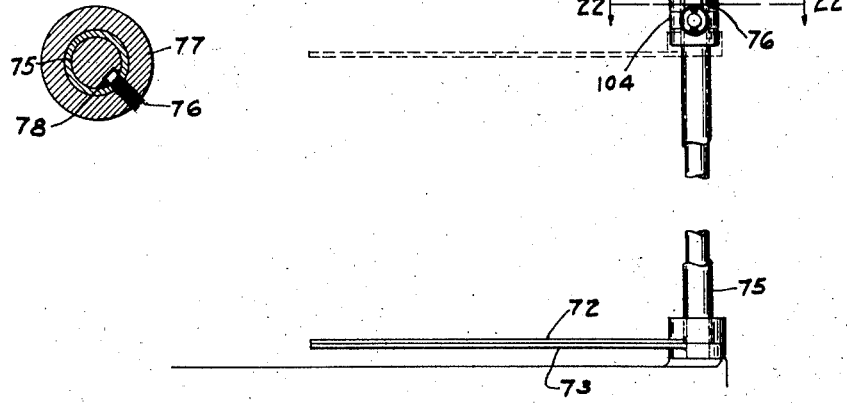

C. A. TRIPP.
LIQUID DISPENSING MACHINE.
APPLICATION FILED OCT. 22, 1917.

1,366,221.

Patented Jan. 18, 1921.
9 SHEETS—SHEET 9.

INVENTOR
CHARLES A. TRIPP
BY
Lockwood & Lockwood
ATTORNEYS

UNITED STATES PATENT OFFICE.

CHARLES A. TRIPP, OF INDIANAPOLIS, INDIANA, ASSIGNOR TO HOLCOMB & HOKE MANUFACTURING COMPANY, OF INDIANAPOLIS, INDIANA, A CORPORATION.

LIQUID-DISPENSING MACHINE.

1,366,221.   Specification of Letters Patent.   Patented Jan. 18, 1921.

Application filed October 22, 1917. Serial No. 197,854.

*To all whom it may concern:*

Be it known that I, CHARLES A. TRIPP, a citizen of the United States, and a resident of Indianapolis, county of Marion, and State of Indiana, have invented a certain new and useful Liquid-Dispensing Machine; and I do hereby declare that the following is a full, clear, and exact description thereof, reference being had to the accompanying drawings, in which like characters refer to like parts.

This invention relates to a liquid dispensing apparatus and the main feature of the device is to provide mechanically and automatically operated means for dispensing liquid in pre-determined quantities.

Another feature of the invention is the provision of means for storing a quantity of drinking cups or the like in position to be projected below the discharge point of the liquid one at a time and means for elevating the top most cup and additional means for supporting the same while being filled with the liquid and further depositing the cup in a receptacle from whence it may be thrown away.

One feature of the invention consists in providing means for automatically depositing the used vessel or container in a waste receptacle after the receptacle has been returned to the dispensing machine by the purchaser.

Another feature of the invention is the provision of means for supporting a plurality of drinking cups or vessels and for consecutively moving the same into position to be placed below the discharge end of the nozzle, singly.

Another feature of the invention is the provision of means for operating the various parts of the liquid dispensing mechanism so as to finish one complete dispensing operation with one revolution of a shaft and a further feature of the invention is the provision of a power applying mechanism and a coin controlled means for operating the same.

Further objects and advantages will be hereinafter more fully explained and pointed out in the accompanying specifications.

In the accompanying drawings which are made a part of this application, Figure 1 is a side elevation of a liquid dispenser showing parts of the lower portion thereof broken away.

Fig. 2 is a front elevation thereof.

Fig. 3 is an enlarged detail side elevation of the upper portion of the mechanism employed for operating the dispenser.

Fig. 4 is a similar view partly in section, of the lower portion of the dispensing mechanism.

Fig. 5 is a horizontal sectional view as seen on line 5—5 of Fig. 2.

Fig. 6 is a detail elevation of the cup controlling mechanism as seen from line 6—6 of Fig. 2.

Fig. 7 is a top plan view thereof as seen from line 7—7 of Fig. 6.

Fig. 8 is a detail side elevation of the drain controlling mechanism as seen on line 8—8 of Fig. 2.

Fig. 9 is a plan view thereof as seen on line 9—9, of Fig. 8.

Fig. 10 is a detail view of the drain partly in section as seen on line 10—10 of Fig. 9.

Fig. 11 is a detail side elevation of the operating means for the cup supporting mechanism as seen on line 11—11 of Fig. 2.

Fig. 12 is a plan view thereof as seen on line 12—12 of Fig. 11, one position of parts thereof being shown in full lines and another position in dotted lines.

Fig. 13 is a detail sectional view of means for disposing of the used cups when in its closed position as seen on line 13—13 of Fig. 5.

Fig. 14 is a similar view showing the parts in the act of removing a cup from its support.

Fig. 15 is a detail vertical sectional view through the liquid dispensing pump.

Fig 20 is an enlarged sectional view as seen on line 20—20 of Fig. 2 showing the parts coöperating with the coin controlled mechanism for releasing the operating mechanism for the dispenser.

Fig. 21 is a detail elevation of the gear construction employed for operating the dispensing pump.

Fig. 22 is a sectional view as seen on line 22—22 Fig. 6.

Fig. 23 is a similar view as seen on line 23—23 of Fig. 8.

Figure 16:
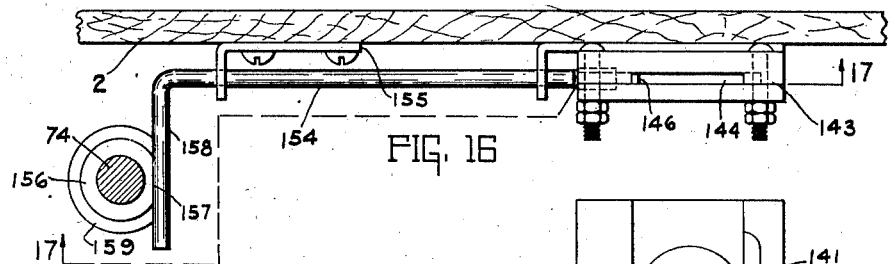
Fig. 16 is a top plan view of the coin controlled mechanism for starting the operation of the dispensing mechanism, parts being shown in section.
Figure 17:
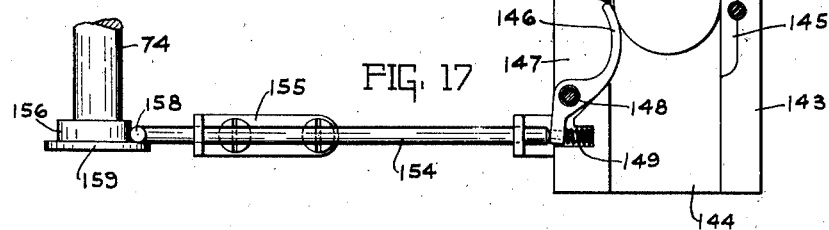
Fig. 17 is a detail sectional view as seen on line 17—17, Fig. 16.
Figure 18:
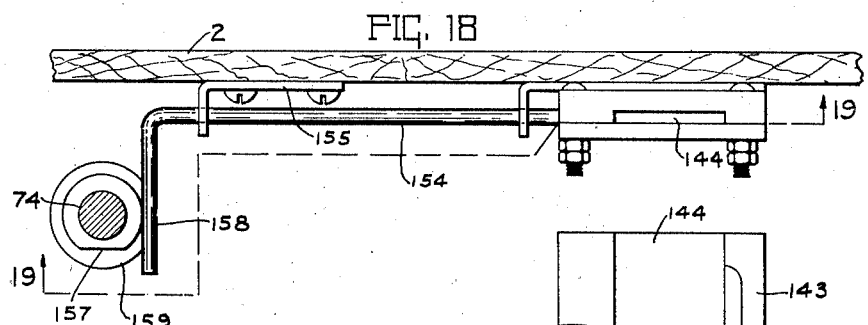
Fig. 18 is a view similar to Fig. 16 showing parts of the device operated to release the coin from the coin controlling mechanism.

Referring to the drawings in which similar reference numerals designate corresponding parts throughout the several views, 1 indicates a cabinet which may be constructed in any preferred manner the lower portion thereof being preferably constructed of panels of wood 2, while the upper portion thereof is preferably formed of sections of glass 3, said sections being retained in position by means of metal strips 4 and a cover plate 5.

The rear glass section 3 is hinged at one end to form a door 6 by which access may be had to the interior of compartment 7 formed by the glass sections, the door 6 being held in closed position by means of a removable rod 8 while the opposite end thereof is hinged to a rod 9 and by removing the rod 8 the door 6 may be swung to open position.

The compartment 7 extends substantially two thirds the length of the cabinet 1 and forwardly of said compartment is a platform 10 which is substantially flush with the upper end of the paneled portion of the cabinet and below said platform is a compartment 11. The compartment 7 extends a distance below the upper edge of the paneled portion of the cabinet and that portion below the glass sections is provided with a lining of metal 12 to form the same into an ice receptacle 13 while below the ice receptacle is a space 14 for the reception of the combined drip and refuse pan 15, a door (not shown) being provided at the rear end of the cabinet through which the pan 15 may be removed.

Mounted within the compartment 7 and partly within the ice receptacle 13 is a sealing cup 16 having a ring 17 at its upper end carried by suitable supports 18, said sealing cup being of any preferred construction such as is used in connection with drinking fountains to receive the neck 19 of a bottle or demijohn 20, the sealing cup regulating the flow of the contents from the bottle. Communicating with the bottom portion of the sealing cup 16 is a vertically extending pipe 21 which communicates with a horizontally extending pipe section 22, said pipe section 22 in turn communicating with a vertical pipe section 23, the latter pipe section communicating with a pump structure 24. Connected to pipe section 22 between the pipe sections 21 and 23 is a pipe 25 which leads from the pipe section 22 to the nozzle 26 projecting through the front glass section 3, a check valve 27 being positioned in the pipe section 22 between the pipe 25 and pipe 21 so as to prevent the return of the liquid being dispensed into the sealing cup after the same has once been pumped therefrom. The pump structure 24 is of such design as to render the same sanitary and at the same time prevent foreign particles such as grease and the like from coming in contact with the liquid being dispensed and consists of a cylinder 28 the lower end of which is closed and attached to the upper end of the vertical pipe section 23 while the opposite end of the cylinder is open. Adapted to reciprocate within the cylinder 28 is a piston 29 carried on a shaft 30, said piston when moved upwardly drawing a supply of the liquid from the bottle into the pipe sections 22 and 23 and the portion of the cylinder below the piston and forcing the liquid upwardly through the pipe 25 and through the nozzle 26 into a suitable receptacle when the piston travels downwardly. In order to prevent any foreign substances from entering the upper end of the cylinder 28, a bell 31 is disposed over the upper end of the cylinder and is spaced a sufficient distance therefrom so that the bell will not contact with the piston, thereby avoiding any friction or wear upon the exterior of the cylinder. The bell 31 is fixed directly to the shaft 30 in any suitable manner and travels upwardly and downwardly with the shaft, thus dispensing with the usual form of packing ordinarily employed with pumps of this nature and thus avoiding any possibility of grease, water or like substances from being carried into the interior of the pump by movement of the shaft through the packing. It will be understood of course, that the length of the bell is greater than the stroke of the piston so that the upper end of the cylinder is always covered and surrounded by the bell.

The shaft 30 of the pump structure 24 is attached at its upper end by means of a link 32 to one end of a walking beam 33, said beam being pivotally connected at its longitudinal center to a bracket 34, which bracket in turn is mounted upon the cover plate 5. The opposite end of the walking beam 33 is pivotally connected to a link 35 which is in turn pivotally attached at its opposite end to a crank arm 36 carried by a shaft 37, said crank arm being fixed to said shaft and caused to rotate therewith. The shaft 37 extends transversely of the cabinet and for convenience is formed in two sections "a" and "b," said sections being mounted in brackets 38 attached to the cover plate 5. The meeting ends of the sections "a" and "b" are at the intermediate bracket 38 while the outer end of section b is fixed to a worm gear 39 which meshes with a worm 40 carried by a rearwardly extending shaft 41. The shaft 41 is provided at its other end with a wheel 42 around which extends a belt or other driving means 43, said belt also passing around a wheel 44 attached to a shaft of the motor 45 and by means of which the shaft 41 is driven. The parts of the pumping device are so arranged that a charge of the liquid is retained between the check valve 27 and the pump structure 24 and the pump structure is so connected to the shaft 37 that one revolution of said shaft will expel the charge of the liquid through the nozzle 26 and draw a new charge of the liquid into the pump structure and pipe sections and as the pipe sections and cylinder of the pump structure are packed in ice the liquid will be thoroughly cooled while passing from the bottle to the discharge nozzle. The pipe sections 21, 22, 23 and 25 form a continuous conduit from the receptacle 20 to the nozzle 26.

It will likewise be seen that by constructing the pump in the manner shown, should any of the liquid escape around the piston 29, and be thrown over the upper end of the cylinder 28 the water within the ice receptacle will wash said liquid off of the cylinder and thus keep the same in a thoroughly sanitary condition.

In order to cool the liquid within the bottle 20 and at the same time keep the interior of the glass incased portion of the cabinet in a sanitary as well as cooled and cleanly condition, a hollow tube 46 is mounted upon brackets 47 carried on the ring 17, said tube having a plurality of openings 48 through which jets of water may be thrown to the upper end of the compartment 7 and caused to descend onto the bottle 20 and the glass sections 3, the water being forced through said openings by means of a centrifugal pump 49 which pump is located adjacent the bottom of the ice receptacle 13 and, as the water is formed by the melting ice it will be very cold and will thus thoroughly cool the contents of the bottle and the interior of the upper portion of the compartment 7 and as the water runs down over the glass sections and the bottle it will keep the surfaces thereof thoroughly cleansed. The centrifugal pump 49 is operated through the medium of a shaft 50 which has a worm gear connection 51 with the shaft 41.

The shaft 37 is formed in two sections in view of the fact that it is necessary at times to rotate one part of the shaft while the other part of the shaft remains idle and to accomplish this result a gear 52 is secured to the section "b" of the shaft 37 which meshes with a gear 53 of a clutch mechanism 54, which clutch mechanism may be of the usual or any preferred construction and which is mounted upon a shaft 55, mounted in brackets 56 depending from the under face of the cover plate 5.

At one end of the shaft 55 is a gear 57 which is segmental in construction, substantially one half of the periphery thereof being provided with teeth 58 while the remaining portion is left smooth as shown at 59. This gear 57 coöperates with a gear 60 on the section "a" of the shaft 37, said gear having a smooth space 61 on its periphery which is adapted to coöperate with the smooth surface 59 of the gear 57 so that said gear 57 can perform a half revolution without actuating the gear 60 thus permitting the section "b" of the shaft 37 to continuously rotate while the section "a" of the shaft 37 is stationary during a portion of the time, the purpose of which will hereinafter be more fully set forth. It will be understood, of course, that the gear 60 can be mounted in any suitable manner so as to be operable independently of the section "b" of the shaft 37.

In order to provide a drinking receptacle and one that will be thoroughly sanitary, means is provided for storing a quantity of individual drinking cups and dispensing the same one at a time, or rather providing a new drinking cup each time that the dispensing device is operated. To this end a magazine 62 is mounted in the compartment 11 below the platform 10 which magazine is slidably mounted upon rods 63 and is adapted to hold a plurality of cups 64 in telescoped relation, the magazine being supported by cables 65 which pass over sheaves 66 suspended from the platform 10 and have their opposite ends attached to a counter weight 67, likewise slidably mounted between rods 68. The cups 64 pass upwardly through a recess 69, formed in the platform 10 at a point immediately below the discharge end of the nozzle 26, said recess being normally closed by means of a swinging support 70. The stack of cups 64 press against the bottom of the swinging support 70 when the support is positioned over the cups and each cup is provided at its upper edge with a rib 71. As the cups are caused to move bodily upwardly when the swinging support is moved laterally from over the recess 69 and to prevent more than one of the cups from passing through said recess at a time, a pair of fingers 72 and 73 are mounted upon a shaft 74 extending between the platform 10 and the cover plate 5, the finger 72 being attached to a sleeve 75, which is vertically slidable upon the shaft 74 and caused to rotate therewith through the medium of a pin 76 which extends through a collar 77 on the sleeve 75, through the sleeve 75 and into a longitudinally extending slot 78 in the shaft 74. The fingers 72 and 73 are adapted to be swung laterally and are so positioned that the edge of the finger 72 will pass below the rib 71 of the upper most cup, while the edge of the finger 73 will pass above the rib of the second succeeding cup, the finger 73 thus holding the remainder of the cups against upward movement while the finger 72 will elevate the upper-most cup when the sleeve 75 carrying said finger is moved vertically on the shaft 74.

The finger 72 elevates the upper-most cup a sufficient distance to permit the support 70 to pass below said cup and again be positioned over the recess 69 and over the stack of cups in the magazine and when so positioned the finger 72 is lowered and the cup supported thereby rested upon the swinging support 70, the finger 72 continuing its downward movement until it has reached its initial starting point when the shaft 74 is reversely rotated, and the fingers 72 and 73 returned to their initial starting point. Should the customer after using the cup return the same to position on the swinging support 70, said cup will be moved laterally with the swinging support as the swinging support is moved laterally from over the stack of cups within the magazine. In order to remove said cup from the swinging support and at the same time dispose of the same so that it cannot again be used, or to prevent the same from being thrown upon the ground, thus causing a litter around the cabinet, a trap door 79 is attached to a shaft 80 which shaft is in turn mounted in bearings 81 on the platform 10, said platform having an opening 82 over which the door is positioned when closed, said opening communicating with a chute 83 in the compartment 11 through which the cups may descend into the refuse pan 15. The trap door 79 may be lifted manually by grasping the finger piece 84 and raising thereon, but in order to mechanically raise the trap door 79 and sweep the empty cup from the support 70, after the same is positioned over the recess 69 as shown by dotted lines in Fig. 12.

The shaft 80 is connected to a collar 85 slidably mounted on a sleeve 86 which sleeve is likewise vertically slidable on a shaft 87, the connection with the shaft 80 and the collar 85 being made through pivoted levers 88 and 89. As the sleeve 86 is raised upwardly the shaft 80 will be rotated in its bearings and the trap door 79 swung to an upward position. However, the support 70 is moving to position over the recess 69 while the trap door is being swung upwardly so that said support passes over a hook 90 secured to the under face of the trap door before the door has reached its uppermost position, thereby causing the hook to swing upwardly and rest in the path of the cup upon the support, after the door has reached its upper-most position. The door is still retained in its upward position until the support 70 moves out of the path of the door or from over the recess 69, thus causing the hook to engage the cup and remove the same from the support and as the cup is directly over the recess 69 it will descend through the chute 83. The movement of the support 70 and the door 79 is so timed that by the time the support reaches its initial position over the stack of cups, the door will have descended to a closed position.

In order to catch any drippings from the end of the nozzle 26 and at the same time form a closure for the end of the nozzle, a drain pipe 91 is employed which is provided with a flared upper end 92 which clamps against the lower open end of the nozzle 26, the drain pipe 91 having its opposite end loosely entered in a waste pipe 93 which extends downwardly into position to empty into the drip pan 15. The drain pipe 91 is provided with a socket 94 into which extends a tongue 95, having a recess 96 therein for engagement with a pin 97 in the socket 92. The opposite end of the tongue 95 is pivotally secured to the lower end of a rod 98, a ferrule 99 being slidably mounted on the rod 98 to hold the tongue 95 against swinging movement. The rod 98 is hollow and receives a rod 98' extending downwardly from the cover plate 5, the rod 98 being slidable thereon.

The object of providing this means of attaching the drain pipe to the rod, in addition to swinging the drain pipe in the arc of a circle from below the mouth of the nozzle 26, is to provide convenient means for disengaging the rod from the drain pipe so that the pipe may be removed and thoroughly cleansed without disengaging any parts of the mechanism other than the moving upwardly of the ferrule 99 and the swinging of the tongue 95 laterally out of the socket.

The finger 72 is raised and lowered through the medium of a cam wheel 100 which is mounted upon the shaft 55 and is caused to rotate therewith. One face of the cam wheel is provided with a cam channel 101 in which a roller 102 travels, said roller being rotatably mounted on an arm 103, said arm having one of its ends pivotally attached to one of the brackets 56 and its opposite end pivotally connected to a collar 104 on the sleeve 75, through the medium of links 105, the inner end of the arm 103 being bifurcated so as to straddle the shaft 74. The raised and lowered positions of the finger 72 are shown by dotted and full lines in Fig. 6 of the drawings.

On the opposite side of the cam wheel 100 and integral therewith, is a hub 106 circumferentially of which is formed a cam channel 107 in which travels a roller 108, carried by a lever 109. The outer end of the lever 109 is pivoted to the under face of the cover plate 5, while the inner end thereof is connected to the shaft 74 through the medium of links 110 and 111. The lever 109 and parts coöperating therewith is employed for rotating the shaft 74 and swinging the fingers 72 and 73 into and out of engagement with the drinking cups.

The shaft 55 has an additional cam wheel 112 fixed thereon in one face of which is a cam channel 113 with which coöperates a roller 114 carried by an arm 115. The outer end of the arm 115 is pivoted to one of the brackets 56 while the opposite end thereof is attached to a collar 116 through the medium of links 117. The collar 116 is mounted between collars 118 on the rod 98, the upper collar 118 being attached to the rod 98 by means of a pin 119, said pin extending through the rod 98 and into a channel 120 in the rod section 98' which causes the section 98 of the rod to rotate with the section 98' while at the same time the section 98 can be moved upwardly and downwardly upon the section 98'.

The wheel 112 is also provided with a hub 121 in which is formed a peripheral cam channel 122 in which travels a roller 123 rotatably attached to a lever 124. The outer end of the lever 124 is pivoted to the under face of the cover plate 5, while the inner end thereof is attached to the rod section 98' through the medium of links 125 and 126, said lever and parts attached thereto being employed in swinging the drain pipe 91 into and out of registration with the discharge end of the nozzle 26. A cam wheel 127 is attached to the shaft 55, said cam wheel having in one face a cam channel 128 in which travels a roller 129 carried by an arm 130, the outer end of the arm being pivoted to one of the brackets 56 while the opposite end thereof is attached to a collar 131 on the sleeve 86 through the medium of links 132, said arm being employed for swinging the trap door 79 to open and closed position. As previously stated, the trap door 79 may be manually opened and when so operated a spring 133 is employed for returning the door to closed position.

Figure 19:
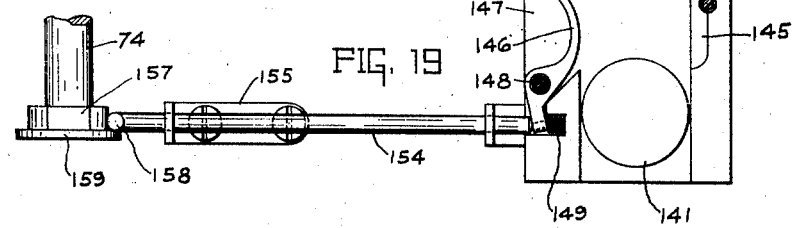
Fig. 19 is a sectional view as seen on line 19—19 of Fig. 18, showing the position of the parts after the coin has been released.

The cam wheel 127 is likewise provided with a hub 134 in which is formed a peripheral cam channel 135 in which travels a roller 136 carried by a lever 137, the outer end of the lever being pivotally secured to the under face of the cover plate 5, while the opposite end thereof is attached to a shaft 138 through the medium of links 139 and 140, the shaft 138 having the movable support 70 attached thereto, the lever 137 and its parts being employed for controlling the movement of the support 70. In starting the machine to dispense liquid from the bottle, a coin 141 is inserted in a slot 142 and descends into a switch box 143, which is preferably constructed of non-conducting material. As the coin descends through a slot 144 in the switch box 143, it closes an electric circuit by engaging contact points 145 and 146 at the edges of the slot 144. The contact 146 is pivotally mounted in a recess 147 and the portion thereof above the pivot point 148 is curved and is normally held projected into the slot 144 a sufficient distance to engage the coin and prevent its further descent through the slot 144 until the lower end of the contact 146 is moved inwardly, thus swinging the curved portion of said contact out of the path of the coin as shown in Fig. 19 of the drawings. The curved end of the contact 146 is normally held in its inward position through the medium of a spring 149 which presses outwardly against the lower straight end of said contact point.

As soon as the coin engages the contacts 145 and 146, a magnet 150 is energized and the core 151 thereof moved into the magnet which operates a pawl 152 and locks the parts of the clutch mechanism 54 together so that the shaft 55, upon which the clutch is mounted, will be rotated. In view of the fact that the motor 45 is continuously running as is also the section $b$ of the shaft 37 upon which the gear 52 is mounted, the locking of the parts of the clutch together will impart motion to the shaft 55 and operate the cam mechanisms mounted thereon. It will likewise be seen that in view of the fact that the shaft 50 is geared to the shaft 41 the centrifugal pump 49 will be continuously operating so that the jets of water will be continuously thrown over the bottle containing the liquid and the side walls of the cabinet. The pawl 152 is returned to its initial position through the medium of a cam 153 carried by the clutch mechanism.

As soon as the shaft 55 starts to rotate the lever 109 is swung laterally until the fingers 72 and 73 are properly engaged with the ribs of the first and second cups of the stack of cups. As soon as the fingers have reached this position the lever 137 starts on its lateral movement and swings the movable support 70 to position over the recess 82 and coincident with this movement the arm 130 is operated to elevate the trap door 79. The cam channel 127 is so formed that after the door 79 is elevated to a certain height, the door remains stationary until the support 70 is moved over and beyond the hook 90, when the door is moved to its full open position and the hook 90 rested in the path of the cup on the support, as shown in Fig. 14 of the drawing.

As soon as the support 70 has been moved from over the stacks of cups, the cam wheel 100 swings the arm 103 upwardly to the position shown by dotted lines in Fig. 6 and carries with it the finger 72 which elevates the upper-most cup to such a height that the support 70, on its return movement, will pass below the cup on the finger 72, when the arm 103 again descends and assumes its normal lowered position. The lever 109 is then operated to swing the fingers 72 and 73 away from the cups and to their initial positions.

Coincident to the support 70 reaching its position over the recess 69 the arm 115 is operated to lower the drain pipe 91 out of engagement with the nozzle 26. When the lever 124 is operated to swing the drain pipe to one side of the nozzle so that the liquid, when discharged from the nozzle, will descend directly into the cup.

During the operation of the various parts for shifting the support 70, opening the trap door 79 and moving the fingers 72 and 73 into engagement with the cups and elevating the finger 72, the flat portion 61 of the gear 60 is in registration with the smooth face 59 of the gear 57 so that although the gear 57 is rotating the section "a" of the shaft 37 is stationary. As soon, however as the finger 72 has descended a sufficient distance to deposit the cup carried thereby upon the movable support 70, the teeth 58 of the gear 57 will have moved to a position to engage the teeth of the gear 60 thereby imparting a rotating movement to the section "a" of the shaft 37 and causing the walking beam 33 to rock on its pivot. This action causes the piston 29 to descend in the cylinder 28, thus forcing the charge of the liquid within the pipes and cylinder upwardly through the pipe 25 and through the nozzle 26 into the cup 64, positioned to receive the same.

There is a sufficient number of teeth on the gear 57 to give one complete revolution to the section a of the shaft 37, thus forcing the charge of liquid through the nozzle into the cup and then drawing another charge into the pipes and cylinder. The operation of the lever 124 is so timed that coincident to the final discharge of liquid from the nozzle, the drain pipe, or rather flared upper end thereof will pass below the open end of the nozzle to catch any drippings that may be adhering to the nozzle, and carry the same into the drip pan.

The operation of the arm 115 is likewise so timed that the drain pipe will be elevated as soon as the flared portion is in registration with the end of the nozzle thus completely closing the nozzle and preventing flies and other insects from entering the nozzle. As soon as the coin 141 completes the circuit through the contacts 145 and 146 and energizes the magnet 150 to lock parts of the clutch 54 together, the rotation imparted to the shaft 74 will operate a rod 154 and force the same against the lower end of the contact 146 thus swinging said contact upon its pivot 148 until the curved portion thereof is moved out of registration with slot 144 thus permitting the coin to descend through the slot and break the connection between the contact points.

The rod 154 is slidably mounted in brackets 155 on the side 2 of the cabinet and is moved in one direction by the pressure of a spring 149, the shaft 74 having a circular enlargement 156 at its lower end, one portion of which is provided with a flat face 157 against which the angular extension 158 of the rod rests when the shaft 74 is in its normal position. As soon as the shaft 74 starts to rotate, the flat face portion 157 is moved away from the angular extension 158 and said extension brought into engagement with the circular face of the member 156 thus moving the rod longitudinally and forcing the end thereof against the lower end of the contact point 146. The lower end of the member 156 is provided with a flange 159 upon which the angular extension 158 rests. The contact 146 will be held out of registration with the slot 144 during the time that the shaft 74 is being rotated to swing the fingers into engagement with the cups and then return the same to their initial position. An escape port 160 is provided in the ice receptacle 13 so that the water may escape from said receptacle after it reaches a certain height thus preventing any possibility of the water rising to such a height as to pass into the pump structure.

The invention claimed is:—

1. A liquid dispensing apparatus adapted to discharge liquid intermittently in measured quantities into vessels for receiving the discharged liquid, including vessel discharging means, means for receiving one of the discharged vessels and for positioning the discharged vessel to receive the liquid at each operation of the dispensing apparatus, an oscillatory means for receiving the vessel from the positioning means and for supporting the vessel while being filled, means for moving said oscillatory support away from the dispensing apparatus for positioning the vessel at a point to be discharged from the support, and means adapted to position between the vessel and the dispensing apparatus when the vessel has reached its limit of movement away from the dispensing apparatus to engage the vessel for removing the same from the support upon the return movement of the support.

2. In a liquid dispensing mechanism, means for supporting a plurality of liquid receiving vessels one within the other, a finger for engaging and positioning the uppermost vessel to receive a charge of liquid, and an additional finger for holding the remainder of the vessels against upward movement while the uppermost vessel is being positioned to receive the charge of liquid.

3. In a liquid dispenser, means for positioning a vessel to receive liquid, comprising a finger, a sleeve carrying said finger, a shaft upon which said sleeve is movably mounted, means to rotate said shaft and bring the finger into engagement with the vessel and additional means to elevate said finger for positioning the vessel to receive the liquid.

4. In a liquid dispenser, a magazine for carrying a supply of vessels to be moved one at a time below the liquid discharge point, means for lifting said magazine to successively position the vessels to be removed, automatically operated means for simultaneously lifting one of the vessels into position to receive the charge of liquid and hold the remaining vessels against movement, a support, and means for swinging said support below said removed vessel.

5. A liquid dispenser, including a liquid discharging apparatus, a vessel support separable from said liquid discharging apparatus for receiving a vessel, means for positioning the vessel to receive a charge of liquid from the discharge apparatus, and means to move said vessel support in a horizontal plane into position below the vessel and then into another position to be removed from the support.

6. In a liquid dispensing device, means for positioning and suspending a vessel to receive liquid, a movable support traveling in a fixed horizontal plane, means to swing said support in one direction and into position to receive and support the vessel and then in the opposite direction to carry the vessel to a position to be discharged from the support, and means movable into the return path of the vessel for causing the vessel to leave the support.

7. In a liquid dispensing mechanism the combination with a pump structure, a rod for operating said pump structure, and a walking beam pivoted to said rod, of a power applying shaft, a driving shaft geared to the power applying shaft, a segmental gear on the driving shaft and a coöperating segmental gear, said latter gears having coöperating smooth places whereby the driving shaft may continuously rotate while the last mentioned segmental gear is idle, and means to connect the walking beam to the segmental gear whereby when the gear is rotated the walking beam will be rocked and the pump operated.

8. In a liquid dispenser, means to position a vessel for receiving a charge of liquid, a laterally movable support means for said vessel, means adapted to be moved into the path of the vessel after it and the support have been swung a distance in one direction, and adapted to remove the vessel from the support on the return movement of the support, a shaft, means to apply rotating power to said shaft, and means carried by the shaft for operating all of said parts during one revolution of the shaft.

9. In a liquid dispensing mechanism the combination with a liquid container, a discharge nozzle therefor and means to intermittently discharge the liquid from said nozzle in predetermined quantities, of means to position a receiving vessel below said nozzle, means adapted to be moved in one direction to receive and support said receiving vessel, and then moved in the opposite direction to position the vessel to be removed from the support, means adapted to be moved into the path of the vessel after it has moved to position to be removed, for striking the vessel from the support on its return movement, draining means for said nozzle, a driven shaft, and means carried by said shaft for operating the liquid discharging means, vessel positioning means, and vessel receiving and supporting means during one revolution of the shaft.

10. In a liquid dispensing mechanism the combination with a liquid container, a discharge nozzle therefor, a pump mechanism for discharging the liquid through the nozzle in measured quantities, means for positioning a receiving vessel below said nozzle, a movable support for said vessel, a power applying shaft, a driving shaft for operating said vessel positioning means and supporting means, a segmental gear on said driving shaft, a segmental pinion, and means for connecting said pump mechanism to said segmental pinion whereby said pump mechanism will remain idle during a part of the rotation of the driving shaft and will be operated during the remainder of the operation of the driving shaft.

11. In a vessel transferring device the combination with a vessel magazine and a swinging support adapted to support a vessel, of means to remove the vessel from the support when the support is in one position, comprising a door adapted to be raised and lowered, a hook on said door adapted to be positioned in the path of said vessel to intercept and remove the same from the support when the latter is returned to its initial position, and means for automatically swinging said support back and forth.

12. In a vessel transferring device the combination with a vessel removing device having a shaft for operating the same, of a driven shaft, means to apply power to said driven shaft, a cam wheel having a cam channel in one face thereof, an arm, means to pivotally connect one end of the arm with the vessel removing means, means to pivotally mount the other end of said arm, and a roller on said arm adapted to enter said cam channel whereby when the cam is rotated the vessel removing means will be operated.

13. In a vessel transferring device the combination of a vessel dispensing device, means for operating said mechanism to release a vessel therefrom, of a support for said vessel, means to move said support to a position concentric with the vessel dispensing device, and a cam operated mechanism for swinging the support in one direction and then in the other.

14. In a vessel transferring device the combination of a movable vessel support, a vessel dispensing magazine adapted to hold a plurality of nested vessels, means normally projecting the vessels upwardly from the magazine, said vessel support being movable from said magazine, means for engaging the second outermost vessel to retain the other vessels within said magazine, and means for depositing the outermost vessel upon the removable support.

15. In a vessel transferring device the combination of a vessel dispensing magazine adapted to hold a plurality of nested vessels, means normally projecting the vessels therefrom, a movable vessel support normally retaining said vessels in said magazine and movable therefrom to receive a vessel from the magazine, means for engaging the second outermost vessel to retain the other vessels within said magazine, and means for depositing the outermost vessel upon the movable support.

16. In a vessel transferring device the combination of a vessel dispensing magazine adapted to hold a plurality of nested vessels, means normally projecting the vessels therefrom, a movable vessel support normally retaining said vessels in said magazine and movable therefrom to receive a vessel from the magazine, means for engaging the second outermost vessel to retain the other vessels within said magazine, means separating the outermost vessel from the remaining vessels, and means to move said vessel support into its original position to position the same between the outermost vessel and the remaining vessels to receive the former and support the same.

17. In a vessel transferring device the combination of a vessel dispensing magazine adapted to hold a plurality of nested vessels, gravity means normally projecting the vessels therefrom, means for engaging the second outermost vessel to retain the other vessels within said magazine, means separating the outermost vessel from the remaining vessels, a vessel support, and means to move said vessel support between the outermost vessel and the remaining vessels to receive and support the separated vessel.

In witness whereof, I have hereunto affixed my signature.

CHARLES A. TRIPP.